United States Patent
Murota et al.

(10) Patent No.: US 11,486,696 B2
(45) Date of Patent: Nov. 1, 2022

(54) ON-MACHINE MEASUREMENT DEVICE, MACHINE TOOL, AND ON-MACHINE MEASUREMENT METHOD

(71) Applicant: FANUC CORPORATION, Yamanashi (JP)

(72) Inventors: Masahiro Murota, Yamanashi-ken (JP); Yonpyo Hon, Yamanashi-ken (JP); Akira Yamamoto, Yamanashi-ken (JP); Tomoki Shimizu, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 321 days.

(21) Appl. No.: 16/987,898

(22) Filed: Aug. 7, 2020

(65) Prior Publication Data
US 2021/0048288 A1 Feb. 18, 2021

(30) Foreign Application Priority Data
Aug. 14, 2019 (JP) ............................. JP2019-148709

(51) Int. Cl.
*G01B 11/08* (2006.01)
*G01B 11/255* (2006.01)
*B23Q 17/22* (2006.01)

(52) U.S. Cl.
CPC .......... *G01B 11/08* (2013.01); *B23Q 17/2233* (2013.01); *G01B 11/255* (2013.01)

(58) Field of Classification Search
CPC .. G01B 11/08; G01B 11/255; B23Q 17/2233; B23Q 17/20; B23Q 17/22; B23Q 17/24
See application file for complete search history.

(56) References Cited

U.S. PATENT DOCUMENTS

| | | | | |
|---|---|---|---|---|
| 9,658,610 | B2* | 5/2017 | Otsubo | B23Q 17/2233 |
| 9,874,439 | B2* | 1/2018 | Bucher | G01B 11/303 |
| 10,328,543 | B2* | 6/2019 | Morimura | B23Q 17/0966 |
| 11,327,463 | B2* | 5/2022 | Shimizu | G05B 19/404 |
| 2009/0033271 | A1* | 2/2009 | Hon | G05B 19/4083 318/640 |
| 2015/0375347 | A1* | 12/2015 | Ohta | B23C 3/18 29/889.7 |

(Continued)

FOREIGN PATENT DOCUMENTS

| | | |
|---|---|---|
| JP | 10-286745 A | 10/1998 |
| JP | 2000-055628 A | 2/2000 |

(Continued)

*Primary Examiner* — Yaritza Guadalupe-McCall
(74) *Attorney, Agent, or Firm* — Robert P. Michal, Esq.; Carter, DeLuca & Farrell LLP

(57) ABSTRACT

An on-machine measurement device that locates a tip position of a blade of a machining tool provided on a machining device includes: a measurement unit configured to measure, in a workpiece that has been machined by the machining tool, a height of a reference plane not machined by the machining tool and a height of a machined surface machined by the machining tool; and a locating unit configured to locate the tip position of the blade of the machining tool based on information on a machining depth specified at the time of machining of the workpiece, and the height of the reference plane and the height of the machined surface that are measured by the measurement unit.

11 Claims, 11 Drawing Sheets

(56) References Cited

U.S. PATENT DOCUMENTS

| | | | |
|---|---|---|---|
| 2017/0197287 A1* | 7/2017 | Ishii | B23Q 17/2428 |
| 2018/0299861 A1* | 10/2018 | Ikai | B23Q 1/4857 |
| 2020/0230771 A1* | 7/2020 | Kasahara | B23Q 15/22 |
| 2020/0269458 A1* | 8/2020 | Shamoto | B26D 5/005 |
| 2021/0048288 A1* | 2/2021 | Murota | B23Q 17/20 |

FOREIGN PATENT DOCUMENTS

| | | |
|---|---|---|
| JP | 2001-259966 A | 9/2001 |
| JP | 2010-058238 A | 3/2010 |

* cited by examiner

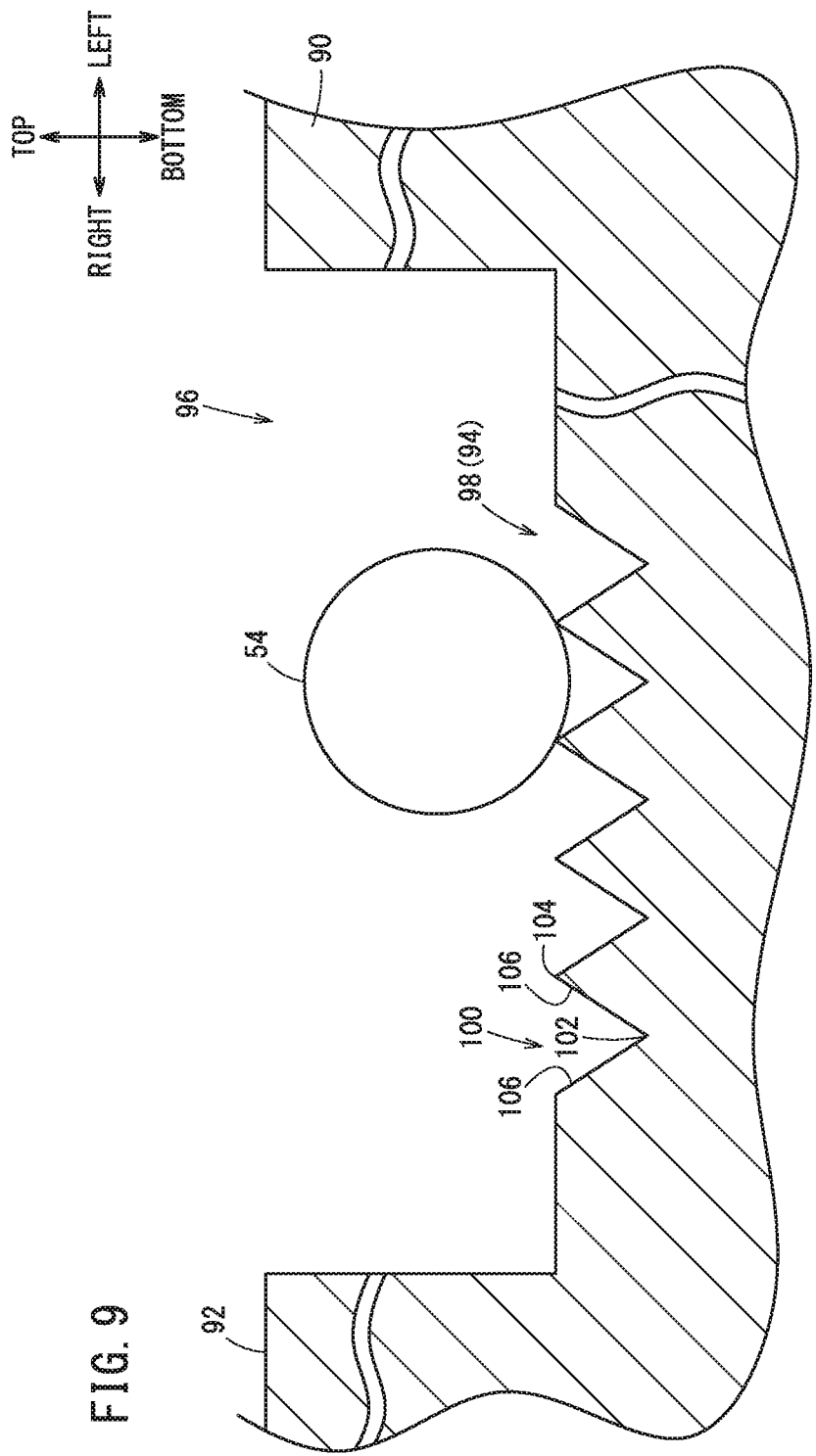

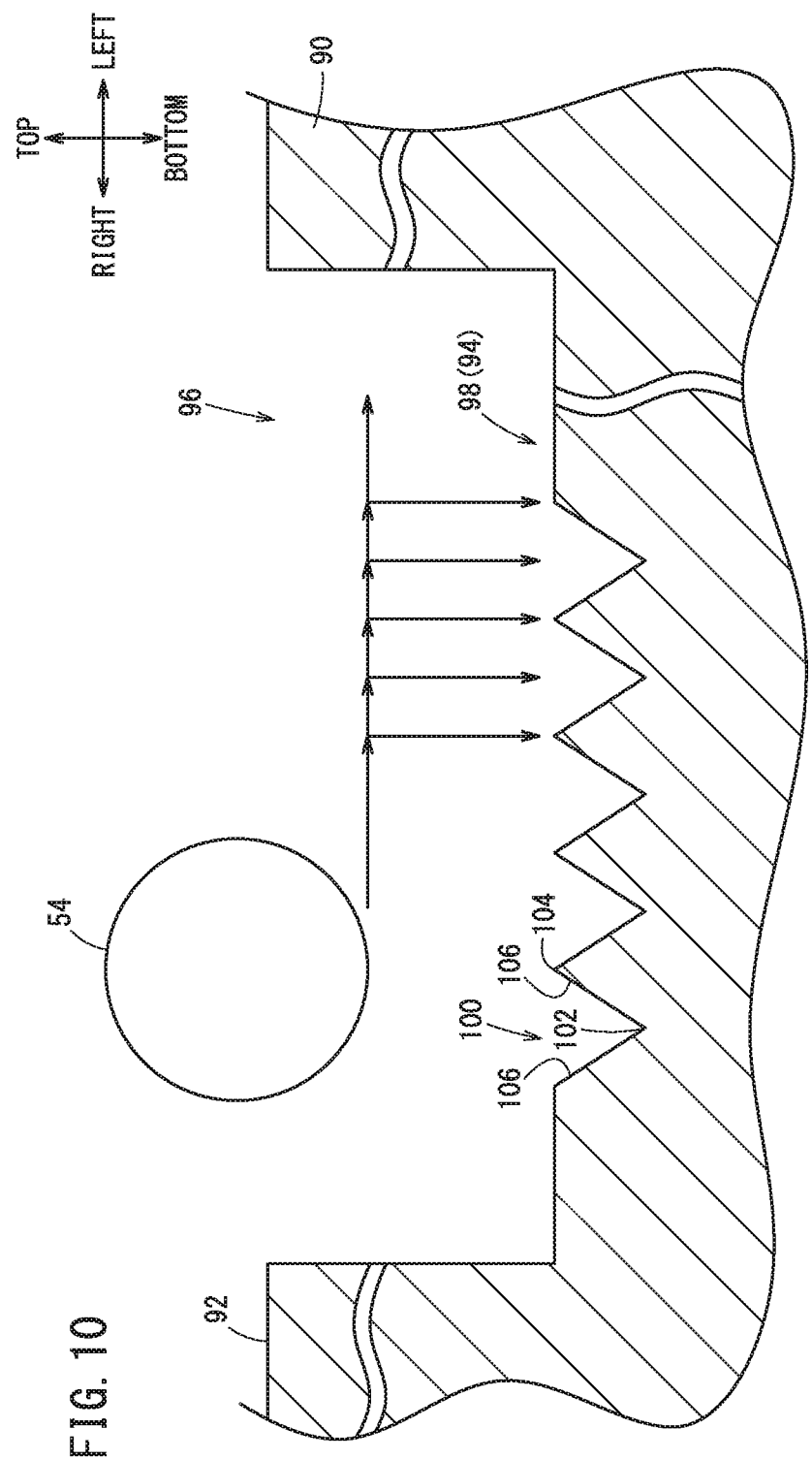

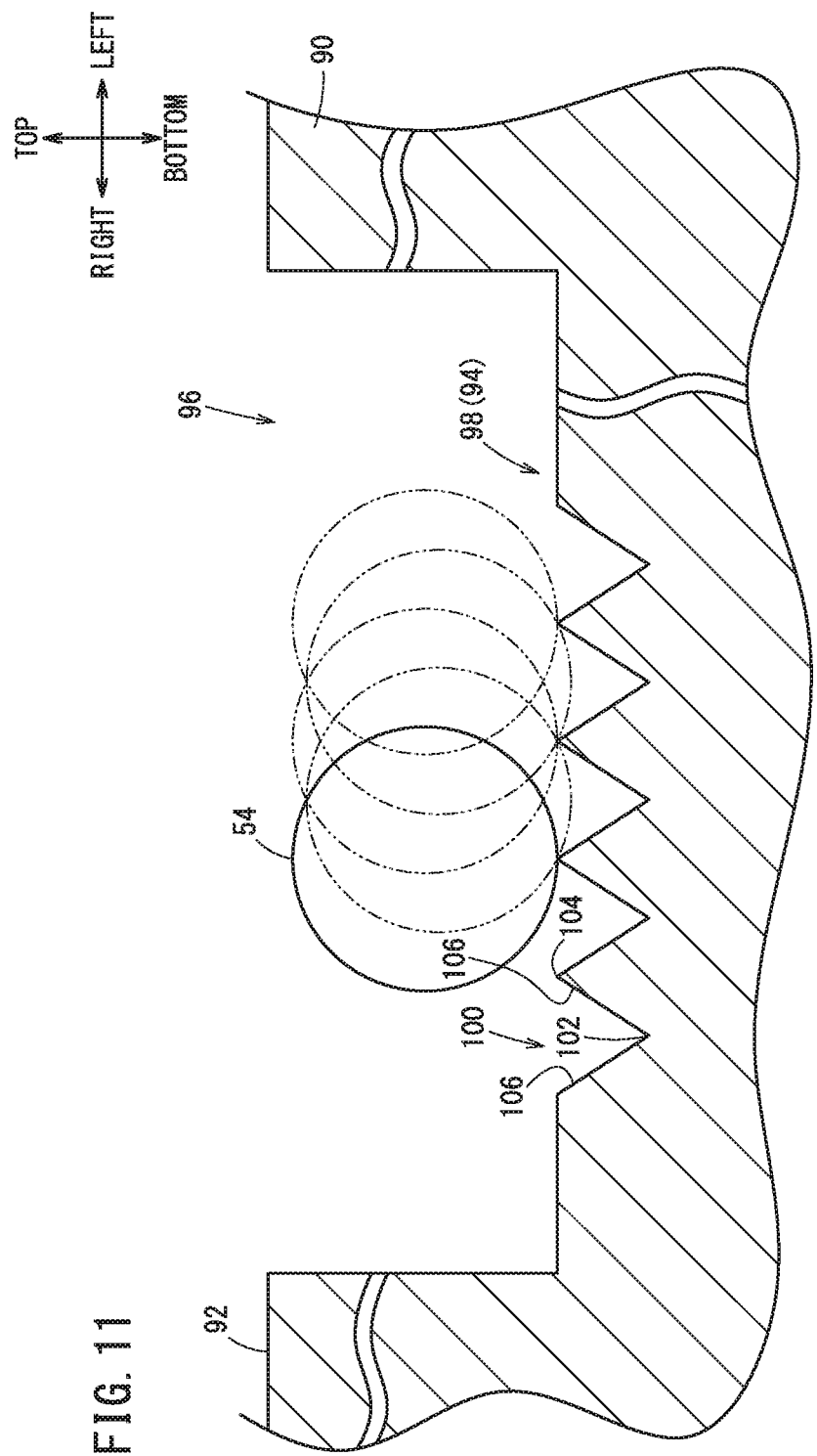

US 11,486,696 B2

ON-MACHINE MEASUREMENT DEVICE, MACHINE TOOL, AND ON-MACHINE MEASUREMENT METHOD

CROSS-REFERENCE TO RELATED APPLICATION

This application is based upon and claims the benefit of priority from Japanese Patent Application No. 2019-148709 filed on Aug. 14, 2019, the contents of which are incorporated herein by reference.

BACKGROUND OF THE INVENTION

Field of the Invention

The present invention relates to an on-machine measurement device for locating (identifying) the position of the tip of the blade of a machining tool provided on a machining device, a machine tool, and an on-machine measurement method.

Description of the Related Art

In high-precision machining using machine tools, it is necessary to find the position of the tip of the blade of the machining tool mounted on the machine tool. Techniques for measuring the tip position of the blade include contact-type tool length measurement devices. However, using contact-type tool length measurement devices is not preferable because the blades of machine tools performing machining operations on the nanoscale level are so sharp-edged that they might be damaged by external force.

Japanese Laid-Open Patent Publication No. 2000-055628 discloses a method for measuring the tip position of the blade of a machine tool without using a contact-type tool length measurement device. This method detects the tip position of the blade by projecting a laser beam onto the tip of a ball endmill attached to the spindle of a machining center and detecting the shadow.

SUMMARY OF THE INVENTION

Some machining tools are made of transparent members (e.g., single-crystal diamond etc.). The laser beam projected onto a transparent machining tool passes through the blade. In this way, the method that projects a laser beam may not be able to detect the tip position depending on the material of the machining tool.

Accordingly, an object of the present invention is to provide an on-machine measurement device that can measure the tip position of the blade irrespective of the material of the machining tool, a machine tool, and an on-machine measurement method.

A first aspect of the present invention is directed to an on-machine measurement device configured to locate a tip position of a blade of a machining tool provided on a machining device. The on-machine measurement device includes: a measurement unit configured to measure, in a workpiece that has been machined by the machining tool, a height of a reference plane not machined by the machining tool and a height of a machined surface machined by the machining tool; and a locating unit configured to locate the tip position of the blade of the machining tool based on information on a machining depth specified at a time of machining of the workpiece, and the height of the reference plane and the height of the machined surface that are measured by the measurement unit.

A second aspect of the present invention is directed to a machine tool including the on-machine measurement device according to the first aspect.

A third aspect of the present invention is directed to an on-machine measurement method of locating a tip position of a blade of a machining tool provided on a machining device. The on-machine measurement method includes: a measurement step of measuring, in a workpiece that has been machined by the machining tool, a height of a reference plane not machined by the machining tool and a height of a machined surface machined by the machining tool; and a locating step of locating the tip position of the blade of the machining tool based on information on a machining depth specified at a time of machining of the workpiece, and the height of the reference plane and the height of the machined surface that are measured in the measurement step.

According to the present invention, it is possible to measure the tip position of the blade irrespective of the material of the machining tool.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 9 is a diagram illustrating a contactor partially entering a V-groove;

FIG. 10 is a diagram illustrating an operation of the contactor in a third embodiment; and FIG. 11 is a diagram illustrating an operation of the contactor in a fourth embodiment.

DESCRIPTION OF THE PREFERRED EMBODIMENTS

The on-machine measurement device, the machine tool, and the on-machine measurement method according to the present invention will be described below in detail in connection with preferred embodiments while referring to the accompanying drawings.

1. Configuration of Machine Tool

The configuration of a machine tool 10 will be described referring to FIGS. 1 to 3. In the description below, two axes that are parallel to the horizontal plane and perpendicular to each other are defined as an x axis and a y axis, and an axis parallel to the vertical plane is defined as a z axis. Also, one side of the x axis is defined as a front side and the other side thereof is defined as a rear side. Further, one side of the y axis is defined as a right side and the other side thereof is defined as a left side. Further, one side of the z axis is defined as a top side and the other side thereof is defined as a bottom side. However, it should be noted that the x axis, y axis, and z axis may be defined to extend in any of the front-rear direction, the right-left direction, and the top-bottom direction.

The machine tool 10 functions as a machining device 12 for machining a workpiece 90 on the nanoscale level and also as an on-machine measurement device 14 for performing on-machine measurement of the workpiece 90 after being machined.

Figure 1:
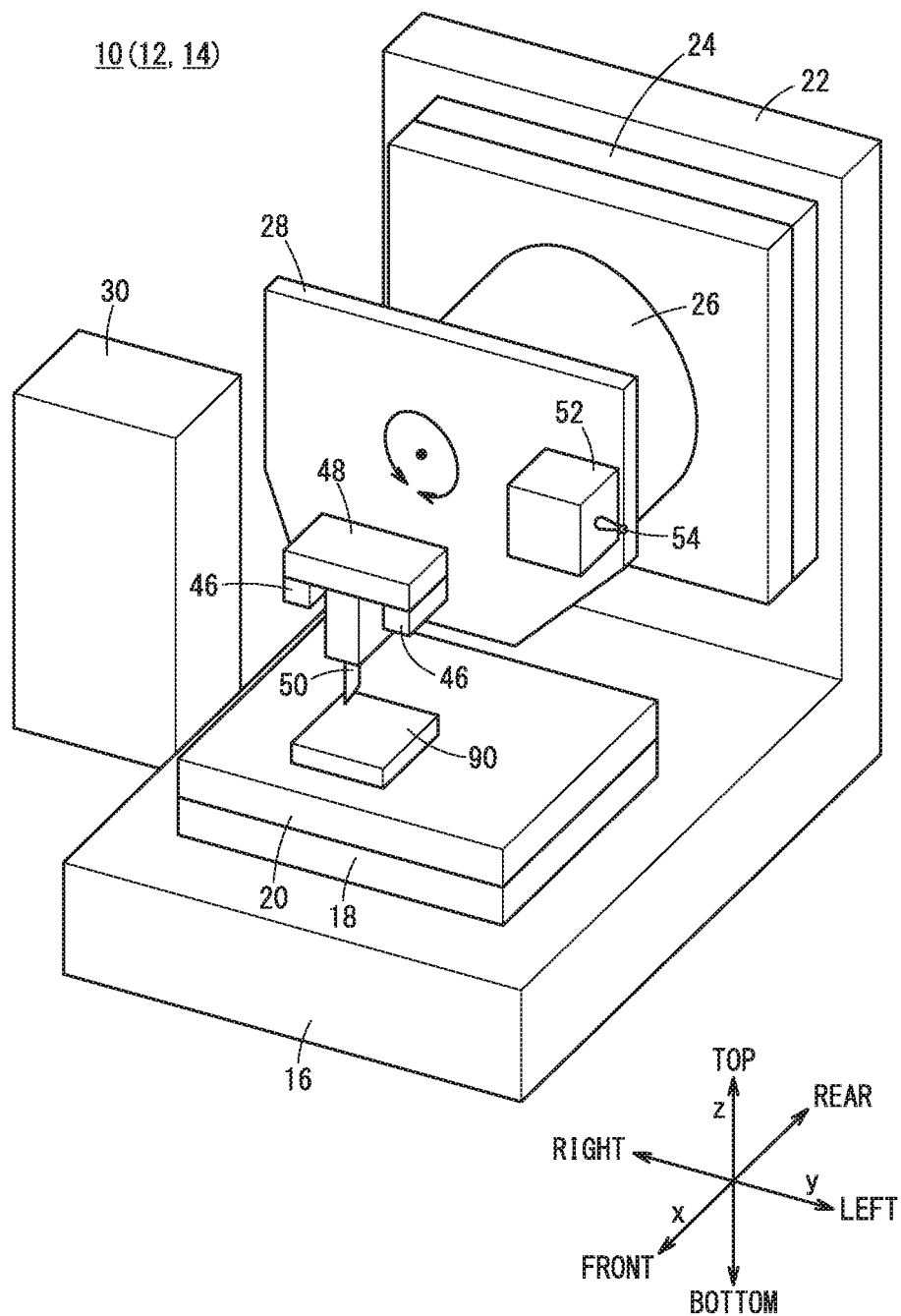
FIG. 1 is a schematic diagram illustrating the appearance of a machine tool.
Figure 2:
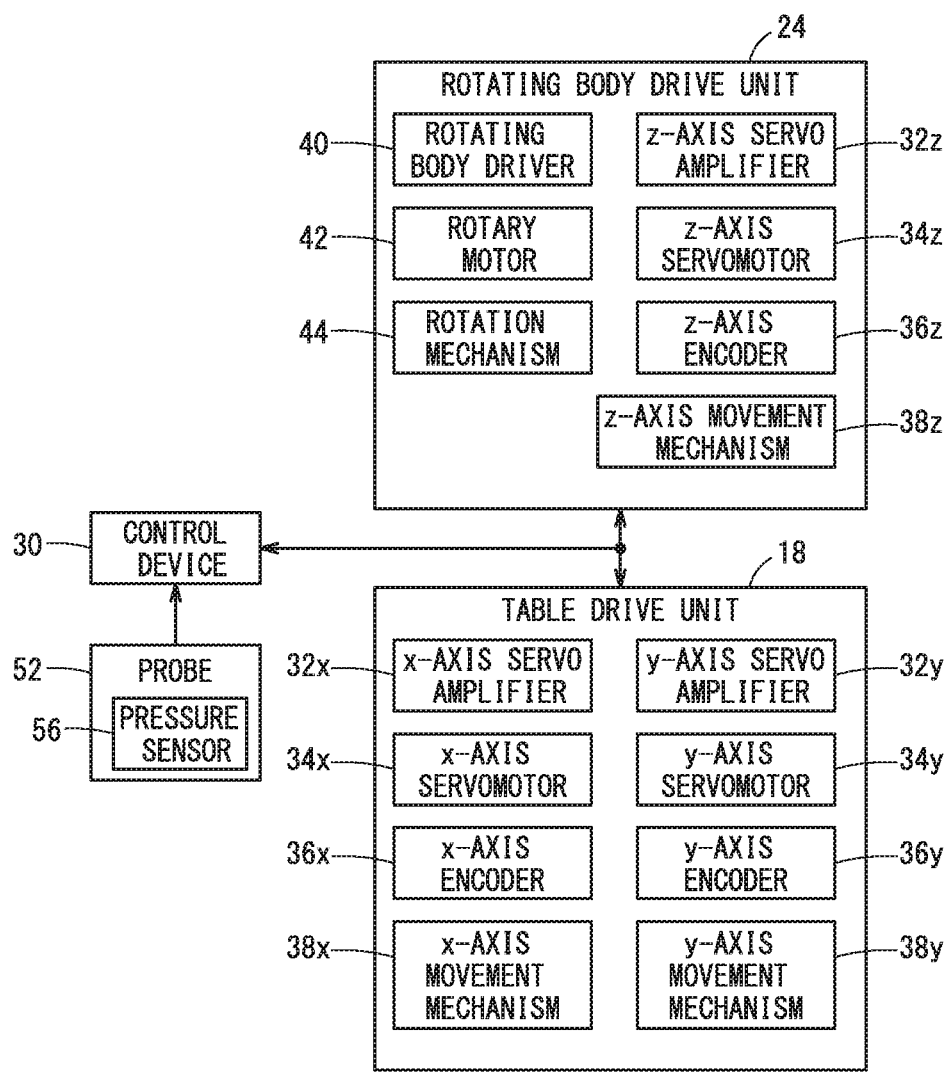
FIG. 2 is a block diagram illustrating the configuration of part of the machine tool.

As shown in FIG. 1, the machine tool 10 includes a bed 16, a table drive unit 18, a table 20, a column 22, a rotating body drive unit 24, a rotating body 26, a rotating plate 28, and a control device 30.

The bed 16 supports all members of the machine tool 10. As shown in FIG. 2, the table drive unit 18 includes an x-axis servo amplifier 32x, an x-axis servomotor 34x, an x-axis encoder 36x, an x-axis movement mechanism 38x, a y-axis servo amplifier 32y, a y-axis servomotor 34y, a y-axis encoder 36y, and a y-axis movement mechanism 38y. The x-axis movement mechanism 38x and the y-axis movement mechanism 38y include motive power transmission mechanisms, such as ball screws. When the x-axis servo amplifier 32x receives a target value as input from the control device 30 and outputs a motive power signal to the x-axis servomotor 34x, the x-axis servomotor 34x rotates and the x-axis movement mechanism 38x moves the table 20 along the x axis. In the same way, when the y-axis servo amplifier 32y receives a target value as input from the control device 30 and outputs a motive power signal to the y-axis servomotor 34y, the y-axis servomotor 34y rotates and the y-axis movement mechanism 38y moves the table 20 along the y axis.

Returning to FIG. 1, the column 22 supports the rotating body drive unit 24. As shown in FIG. 2, the rotating body drive unit 24 includes a rotating body driver 40, a rotary motor 42, a rotation mechanism 44, a z-axis servo amplifier 32z, a z-axis servomotor 34z, a z-axis encoder 36z, and a z-axis movement mechanism 38z. The rotation mechanism 44 includes a motive power transmission mechanism such as gears. The z-axis movement mechanism 38z includes a motive power transmission mechanism such as a ball screw. When the rotating body driver 40 receives a rotation command as input from the control device 30 and outputs a motive power signal to the rotary motor 42, the rotary motor 42 rotates and the rotation mechanism 44 causes the rotating body 26 to rotate around an axis parallel to the x axis. By the rotation of the rotating body 26, one of a machining tool 48 and a probe 52 is directed downward. When the z-axis servo amplifier 32z receives a target value as input from the control device 30 and outputs a motive power signal to the z-axis servomotor 34z, the z-axis servomotor 34z rotates and the z-axis movement mechanism 38z causes the rotating body 26 to move along the z axis.

The rotating body 26 extends along the front-rear direction and moves upward and downward relative to the column 22 as the rotating body drive unit 24 operates. The rotating plate 28 is attached at the front end of the rotating body 26. A set of tool attachment parts 46 and the probe 52 are fixed on the front surface of the rotating plate 28. The tool attachment parts 46 support the machining tool 48 having a blade 50. The machining tool 48 can be attached to and removed from the tool attachment parts 46. The probe 52 has a contactor 54 whose tip is in a curved shape. The contactor 54 is, for example, a spherical body. The probe 52 is attached in a position offset by 90 degrees from the tool attachment parts 46. As shown in FIGS. 2 and 3, the probe 52 includes a pressure sensor 56.

Figure 3:
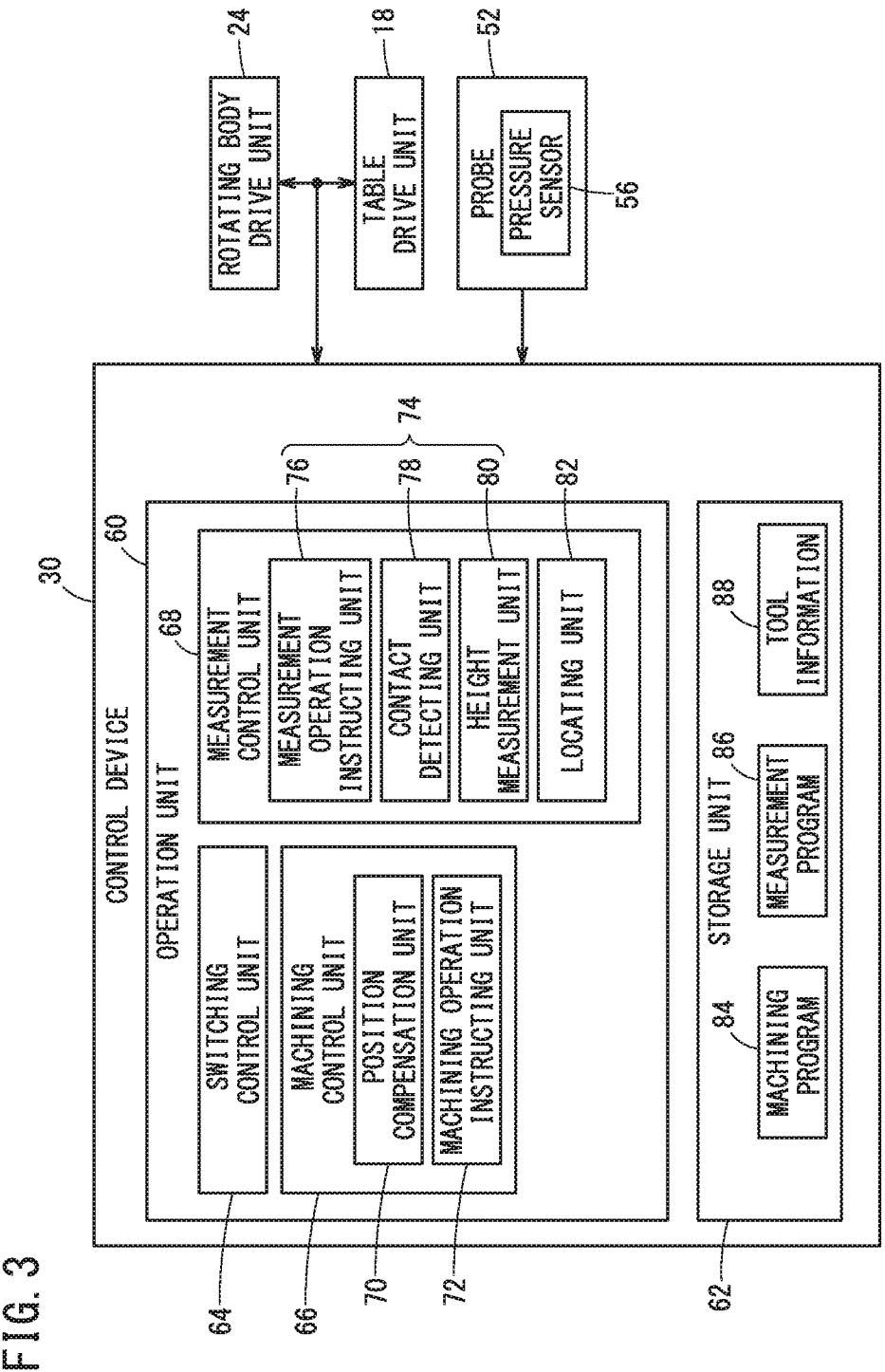
FIG. 3 is a block diagram illustrating the configuration of part of the machine tool.

As shown in FIG. 3, the control device 30 is connected to the table drive unit 18, the rotating body drive unit 24, and the probe 52 through signal lines. The control device 30 includes an operation unit 60 and a storage unit 62. The operation unit 60 is formed of a processor such as a CPU. The operation unit 60 executes programs stored in the storage unit 62 to function as a switching control unit 64, a machining control unit 66, and a measurement control unit 68. The operation unit 60 functions as the machining control unit 66 when the machine tool 10 is used as the machining device 12. The operation unit 60 functions as the measurement control unit 68 when the machine tool 10 is used as the on-machine measurement device 14.

The switching control unit 64 controls the rotating operation of the rotating body 26 to direct one of the machining tool 48 and the probe 52 downward, in response to a switching operation performed by an operator using an operating device (not shown), or in response to transition from machining operation to on-machine measurement, or from on-machine measurement to machining operation.

The machining control unit 66 further functions as a position compensation unit 70 and a machining operation instructing unit 72. The position compensation unit 70 is configured to compensate information concerning the tip position of the blade 50 of the machining tool 48 that is stored in the storage unit 62, when the on-machine measurement device 14 locates the tip position of the blade 50 of the machining tool 48. The machining operation instructing unit 72 is configured to, in machining, output machining target values to the x-axis servo amplifier 32x, the y-axis servo amplifier 32y, and the z-axis servo amplifier 32z on the basis of a machining program 84.

The measurement control unit 68 further functions as a measurement operation instructing unit 76, a contact detecting unit 78, a height measurement unit 80, and a locating unit 82. Among these units, the measurement operation instructing unit 76, the contact detecting unit 78, and the height measurement unit 80 will be referred to as a measurement unit 74 collectively. The measurement operation instructing unit 76 is configured to, in on-machine measurement operation, output measurement target values to the x-axis servo amplifier 32x, the y-axis servo amplifier 32y, and the z-axis servo amplifier 32z, on the basis of a measurement program 86. The contact detecting unit 78 is configured to monitor the pressure value detected by the pressure sensor 56 to thereby determine whether the workpiece 90 and the contactor 54 are in contact with each other. The height measurement unit 80 is configured to determine, as a measured height value, a detection value detected by the z-axis encoder 36z. Also, the height measurement unit 80 compensates the measured value when necessary. The compensation of the measured value will be described in a second embodiment and later. The locating unit 82 locates the tip position of the blade 50 of the machining tool 48.

The storage unit 62 is formed of various memories such as RAM, ROM, and hard disk. The storage unit 62 stores the machining program 84, the measurement program 86, and tool information 88. The machining program 84 is a program for specifying operations of the machining tool 48. The measurement program 86 is a program for specifying operations of the probe 52. The tool information 88 is information indicating the kind, shape, size, angle of attachment, etc. of the machining tool 48. The tool information 88 is information concerning the tip position of the blade 50 of the machining tool 48.

2. Operations of On-machine Measurement Device 14

2.1. First Embodiment

When the operator performs a given operation on the operating device (not shown), the switching control unit 64 turns the rotating plate 28 so as to direct the machining tool 48 downward. At this time, the machine tool 10 functions as the machining device 12. In this case, the operator measures the angle of an axis line 108 of the machining tool 48 (see FIG. 7 and the like) and enters that angle into the storage unit 62 as the angle of attachment of the blade 50 of the machining tool 48.

Figure 4:
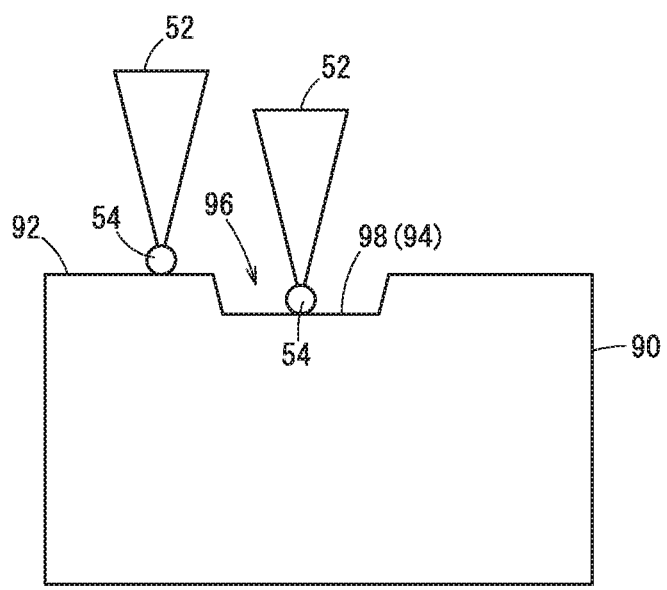
FIG. 4 is a diagram showing how the height of a reference plane and the height of the bottom surface of a recessed portion are measured.

As shown in FIG. 4, the machining operation instructing unit 72 executes the machining program 84 to form a recessed portion 96 having a given depth in the workpiece 90. In this embodiment, in the workpiece 90, the non-machined surface, which is not machined, is defined as a reference plane 92, and a bottom surface 98 of the recessed portion 96 is defined as a machined surface 94.

The switching control unit 64 turns the rotating plate 28 to direct the probe 52 downward, in response to a switching signal output as the operator operates the operating device (not shown), or by being triggered by the end of the machining program 84. At this time, the machine tool 10 functions as the on-machine measurement device 14. The measurement unit 74 starts execution of the measurement program 86 in response to a measurement start signal output as the operator operates the operating device (not shown), or by being triggered by the end of turning of the rotating plate 28.

Figure 5:
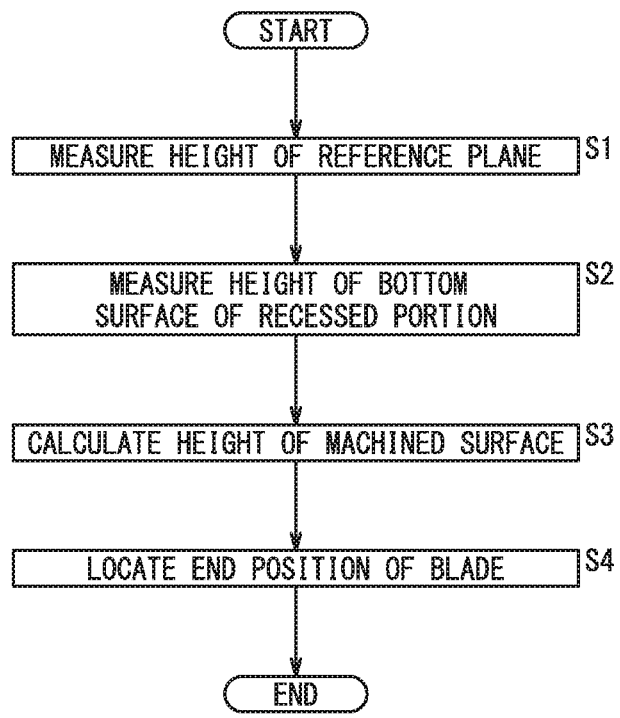
FIG. 5 is a flowchart illustrating a process for locating the tip position of a blade of a machining tool.

As the measurement program 86 is executed, as shown in FIG. 4, the measurement unit 74 measures a height of the reference plane 92 and a height of the machined surface 94 while relatively moving the probe 52, and the locating unit 82 locates the tip position of the blade 50 of the machining tool 48 on the basis of the results of measurement by the measurement unit 74. A specific process will be described referring to FIG. 5.

In step S1, the measurement unit 74 measures the height of the reference plane 92. Now, the measurement unit 74 (measurement operation instructing unit 76, contact detecting unit 78, height measurement unit 80) performs the operations shown below. The measurement operation instructing unit 76 relatively moves the table 20 in the x-y plane so as to place the reference plane 92 right under and in close proximity to the contactor 54 of the probe 52. The position in the reference plane 92 that is brought close to the contactor 54 is predetermined by the measurement program 86. Further, the measurement operation instructing unit 76 causes the rotating body 26 to move along the z axis so as to bring the contactor 54 of the probe 52 close to the reference plane 92. The contact detecting unit 78 detects that the contactor 54 and the reference plane 92 are in contact with each other when the pressure value detected by the pressure sensor 56 exceeds a threshold stored in the storage unit 62. At this time, the height measurement unit 80 causes the storage unit 62 to store, as the height of the reference plane 92, the detection value detected by the z-axis encoder 36z. Further, the measurement operation instructing unit 76 causes the rotating body 26 to move along the z axis so as to bring the contactor 54 of the probe 52 away from the reference plane 92.

In step S2, the measurement unit 74 measures the height of the bottom surface 98 of the recessed portion 96. The operations are basically the same as those in step S1. The measurement operation instructing unit 76 relatively moves the table 20 in the x-y plane so as to place the recessed portion 96 right under and in close proximity to the contactor 54 of the probe 52. The position in the recessed portion 96 that is brought close to the contactor 54 is predetermined by the measurement program 86. Further, the measurement operation instructing unit 76 causes the rotating body 26 to move along the z axis so as to bring the contactor 54 of the probe 52 close to the bottom surface 98 of the recessed portion 96. The contact detecting unit 78 detects that the contactor 54 and the bottom surface 98 are in contact with each other when the pressure value detected by the pressure sensor 56 exceeds a threshold stored in the storage unit 62. At this time, the height measurement unit 80 causes the storage unit 62 to store, as the height of the bottom surface 98, the detection value detected by the z-axis encoder 36z. Further, the measurement operation instructing unit 76 causes the rotating body 26 to move along the z axis so as to bring the contactor 54 of the probe 52 away from the bottom surface 98 of the recessed portion 96.

In step S3, the height measurement unit 80 calculates a height of the machined surface 94. In the first embodiment, the height measurement unit 80 defines, as the height of the machined surface 94, the height of the bottom surface 98 measured in step S2.

In step S4, the locating unit 82 locates the tip position of the blade 50. The locating unit 82 locates the tip position of the blade 50 of the machining tool 48 based on information concerning the machining depth that is specified by the machining program 84 at the time of machining of the workpiece 90, the measured height of the reference plane 92, and the measured height of the machined surface 94. For example, if the machining depth specified by the machining program 84 is D1 and the difference between the height of the reference plane 92 and the height of the machined surface 94 is D2 (<D1), then it is found that the tip position of the blade 50 deviates upward by (D1−D2). The locating unit 82 identifies such a deviation. The locating unit 82 sends the information about the deviation, i.e., the direction and depth of the deviation, to the position compensation unit 70 of the machining control unit 66. Upon receiving the information about deviation, the position compensation unit 70 compensates information concerning the tip position of the blade 50 of the machining tool 48 that is stored in the storage unit 62.

2.2. Second Embodiment

A second embodiment will be described which is able to further improve the measurement accuracy of the first embodiment. An implementation in which the machining device 12 performs a grooving operation according to the machining program 84 will be explained.

Figure 6:
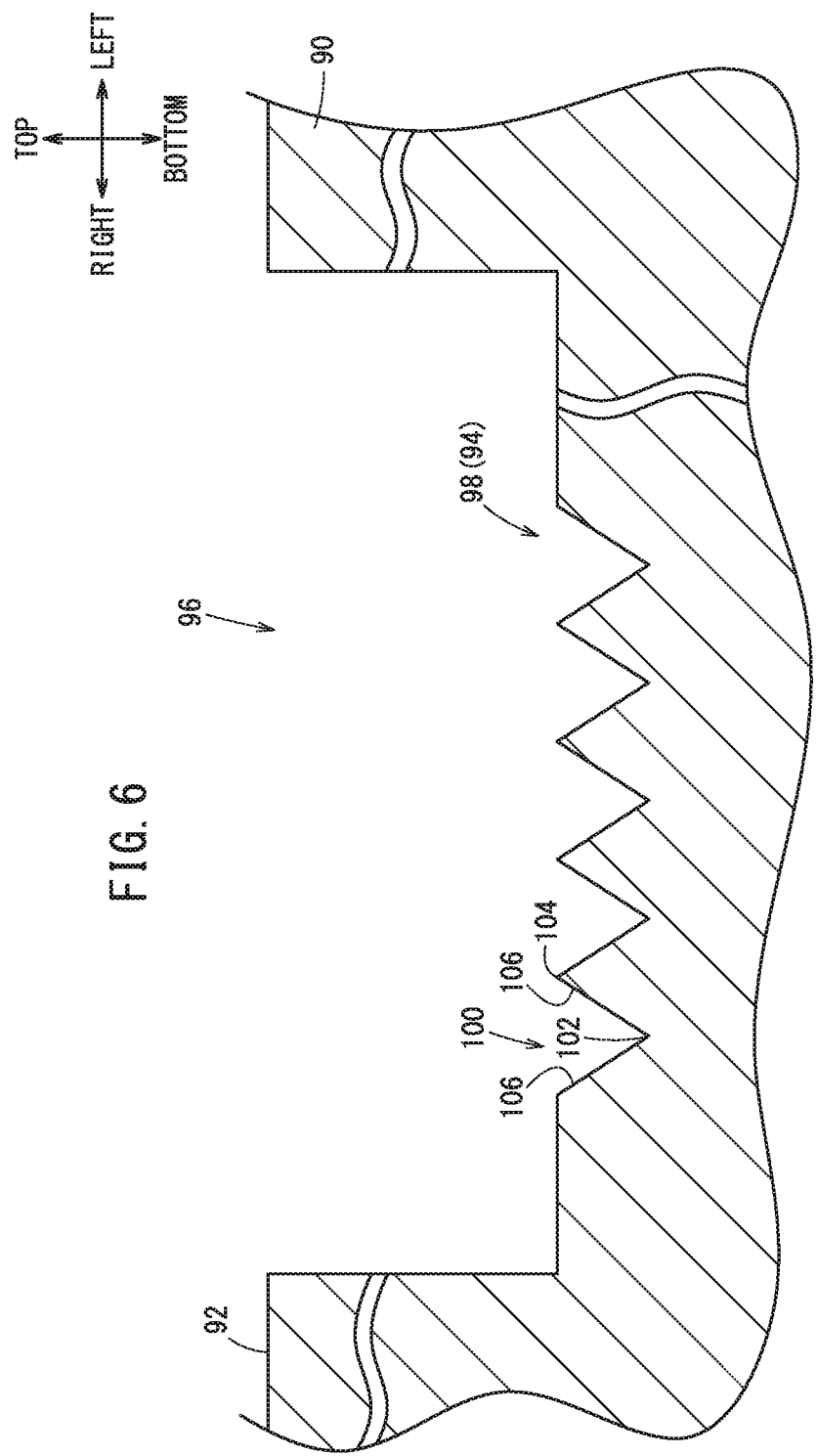
FIG. 6 is a diagram illustrating a cross section of a machined surface in which V-grooves are formed.

The machine tool 10 performs a grooving operation of relatively moving the machining tool 48 in a first direction with the blade 50 abutting on the workpiece 90, while sequentially shifting the machining tool 48 by a given pitch in a second direction that intersects the first direction. For example, the first direction is defined as the rearward direction and the second direction is defined as the leftward direction. As shown in FIG. 6, V-grooves 100 having a V-shaped cross section are formed in the bottom surface 98 of the recessed portion 96 of the workpiece 90. The angle formed between two wall surfaces 106 of each V-groove 100 is the same as the opening angle of the tip of the blade 50. The V-grooves 100 are formed along the path of movement of the grooving blade 50. That is, the V-grooves 100 extend along the first direction and lie side by side successively in the second direction.

In the first embodiment, the height measurement unit 80 obtains, as the height (depth) of the machined surface 94, the detection value that is detected by the z-axis encoder 36z when the contactor 54 of the probe 52 makes contact with the bottom surface 98, whereby the tip position of the blade 50 of the machining tool 48 is located. In this measurement method, accurately locating the tip position of the blade 50 requires bringing the contactor 54 of the probe 52 into contact with a deepest portion 102 of the V-groove 100. However, if the contactor 54 of the probe 52 is larger than the width (pitch) of the V-groove 100, the contactor 54 cannot enter the V-groove 100. Accordingly, the contactor 54 of the probe 52 does not contact the deepest portion 102.

Hence, in the second embodiment, the height measurement unit 80 calculates the height of the machined surface 94 by compensating the detection value detected by the z-axis encoder 36z. Specifically, the height measurement unit 80 calculates the depth of the V-groove 100 (the length from a top 104 to the deepest portion 102), and then adds this calculated value to the detection value detected by the z-axis encoder 36z. It is assumed here that the detection value detected by the z-axis encoder 36z is the height of the top 104 of the V-groove 100. For example, the height measurement unit 80 carries out the calculations below.

[A. When Sectional Shape of V-Groove 100 is Isosceles Triangle]

Figure 7:
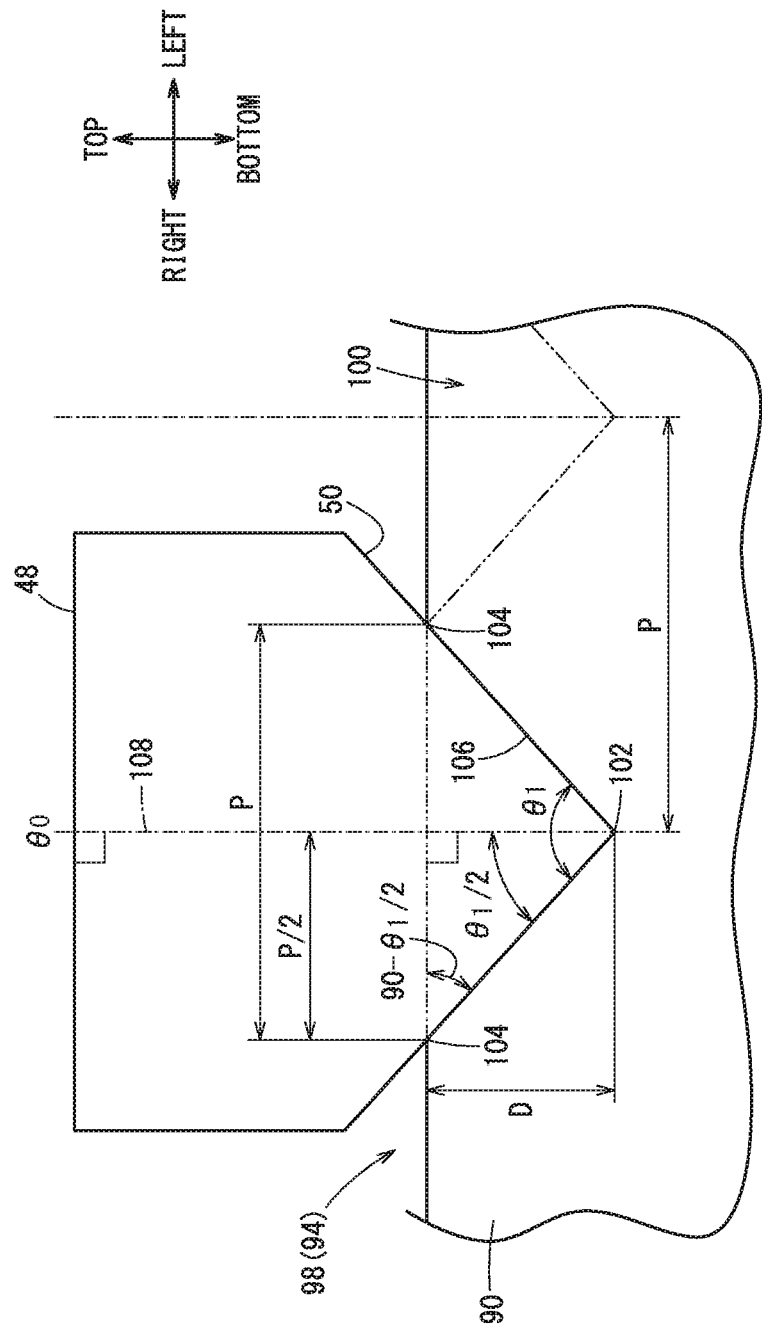
FIG. 7 is a diagram illustrating how the machining tool forms a V-groove having a cross sectional shape that is an isosceles triangle.

Referring to FIG. 7, a method for calculating the depth of the V-groove 100 having an isosceles triangular cross section will be described. For example, if the blade 50 of the machining tool 48 has line symmetry about the axis line 108 and the axis line 108 of the machining tool 48 is perpendicular to the workpiece 90, the cross section of the V-groove 100 is an isosceles triangle.

The height measurement unit 80 receives, as input from the tool information 88, information concerning the shape of the tip of the blade 50 of the machining tool 48 and information concerning the angle of the axis line 108 of the machining tool 48, and determines whether the V-groove 100 forms an isosceles triangle. When the V-groove 100 forms an isosceles triangle, the height measurement unit 80 calculates the depth of the V-groove 100 according to equation (1) below.

$$D=(P/2)\times\tan\{90-(\theta_1/2)\} \qquad (1)$$

where $\theta_1$: the opening angle of the tip of the blade 50 (known from the tool information 88)

P: the pitch of the V-grooves 100 (known from the machining program 84)

D: the depth of the V-groove 100

The height measurement unit 80 adds a depth (D) of the V-groove 100 calculated from equation (1) to the detection value detected by the z-axis encoder 36z, to thereby obtain the calculated result as the height of the machined surface 94. "Add" here means to add the calculated result to the measured height in the depth direction.

[B. When Sectional Shape of V-groove 100 is not Isosceles Triangle]

Figure 8:
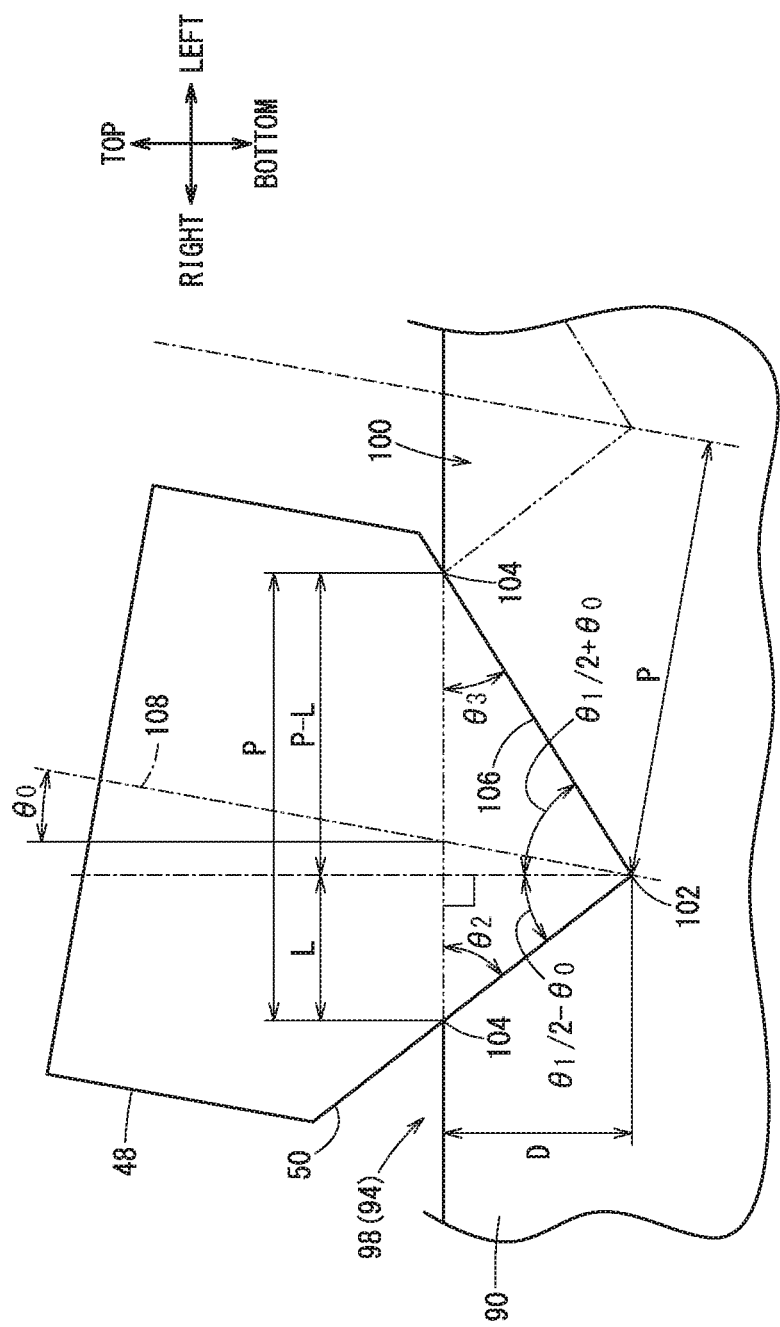
FIG. 8 is a diagram illustrating how the machining tool forms a V-groove having a cross sectional shape that is not an isosceles triangle.

Referring to FIG. 8, a method for calculating the depth of the V-groove 100 having a cross sectional shape that is not an isosceles triangle will be described. For example, even if the blade 50 of the machining tool 48 has line symmetry about the axis line 108, if the machining tool 48 is attached to the machining device 12 in such a manner that the axis line 108 is inclined with respect to the workpiece 90, the cross sectional shape of the V-groove 100 is a triangle other than an isosceles triangle.

The height measurement unit 80 receives, as input from the tool information 88, information concerning the shape of the tip of the blade 50 of the machining tool 48 and information concerning the angle of the axis line 108 of the machining tool 48, and determines whether the V-groove 100 forms an isosceles triangle. When determining that the V-groove 100 does not form an isosceles triangle, then the height measurement unit 80 calculates the depth of the V-groove 100 according to equation (2) below.

$$D=P\times\tan\theta_2\times\tan\theta_3/(\tan\theta_2+\tan\theta_3) \qquad (2)$$

$$\text{where } \theta_2=90-\{(\theta_1/2)-\theta_0\} \qquad (3)$$

$$\theta_3=90-\{(\theta_1/2)+\theta_0\} \qquad (4)$$

$\theta_0$: the angle of the axis line 108 (known from the tool information 88)

$\theta_1$: the opening angle of the tip of the blade 50 (known from the tool information 88)

P: the pitch of the V-grooves 100 (known from the machining program 84)

D: the depth of the V-groove 100

[Calculation of Equation (2)]

D is expressed by the two equations below.

$$D=L\times\tan\theta_2$$

$$D=(P-L)\times\tan\theta_3$$

From the two equations, L is expressed by the equation below.

$$L=(P\times\tan\theta_3)/(\tan\theta_2+\tan\theta_3)$$

Accordingly, $$D=P\times\tan\theta_2\times\tan\theta_3/(\tan\theta_2+\tan\theta_3)$$

The height measurement unit 80 adds the depth (D) of the V-groove 100 calculated from equation (2) to the detection value detected by the z-axis encoder 36z, to thereby obtain the calculated result as the height of the machined surface 94.

The depth (D) of the V-groove 100 can also be calculated according to equation (5), equation (6) below, in place of equation (2) above.

$$D=P\times\sin\theta_3\times\cos(\theta_1+\theta_3)/\sin\theta_1 \qquad (5)$$

$$D=P\times(1+\tan\theta_1/2)\times\tan\theta_0/2\,\tan(\theta_1/2) \qquad (6)$$

2.3. Third Embodiment

A third embodiment will be described which can further improve the measurement accuracy of the second embodiment.

The second embodiment above provides a method in which the height of the machined surface 94 is calculated assuming the detection value detected by the z-axis encoder 36z as the height of the top 104 of the V-groove 100. However, as shown in FIG. 9, part of the contactor 54 of the probe 52 may enter the V-groove 100. In this case, the detection value detected by the z-axis encoder 36z indicates the height of the position slightly deeper than the top 104 of the V-groove 100. Hence, some error may be generated with the method of the second embodiment. In the third embodiment, the measurement unit 74 performs the operations shown below in order to reduce the error.

As shown in FIG. 10, the measurement operation instructing unit 76 controls the y-axis servomotor 34y so as to repeat the operation of relatively moving the probe 52 in the second direction and stopping the probe 52 every given distance. At each position where the y-axis servomotor 34y is stopped, the measurement operation instructing unit 76 controls the z-axis servomotor 34z to cause the contactor 54 to make contact with the machined surface 94. The height measurement unit 80 causes the storage unit 62 to store the detection values detected by the z-axis encoder 36z. When the interval between two adjacent measurement positions does not correspond to the pitch of the V-grooves 100, different multiple detection values are stored. The height measurement unit 80 selects the detection value indicating the height of a shallowest position from among the stored detection values, to thereby obtain this value as the height of the top 104 of the V-groove 100. The height measurement unit 80 adds the depth (D) of the V-grooves 100 calculated by the method explained in the second embodiment to the selected height of the top 104 of the V-groove 100, to thereby obtain the result of calculation as the height of the machined surface 94.

2.4. Fourth Embodiment

A fourth embodiment will be described which can further improve the measurement accuracy of the third embodiment.

As shown in FIG. 11, the measurement operation instructing unit 76 controls the y-axis servomotor 34y and the z-axis servomotor 34z so as to cause the contactor 54 of the probe 52 to relatively move in the second direction while being kept in contact with the machined surface 94. In order to improve accuracy, it is necessary to set the amount of movement to be at least equal to or larger than the pitch of the V-grooves 100. While the probe 52 is making the relative movement, the height measurement unit 80 causes the storage unit 62 to store the detection values detected by the z-axis encoder 36z. The detection values are values that increase and decrease in succession. The height measurement unit 80 selects the detection value indicating the height of a shallowest position from among the stored detection values, to thereby obtain this value as the height of the top 104 of the V-groove 100.

3. Modifications

In the embodiments described above, the machine tool 10 moves the table 20 along the x-y plane and moves the rotating body 26 along the z axis. However, the machine tool 10 may move either of the table 20 and the rotating body 26 along the x axis, y axis, and z axis.

The machine tool 10 includes a set of tool attachment parts 46 on the rotating plate 28 and supports a single machining tool 48. However, the machine tool 10 may include multiple sets of tool attachment parts 46 on the rotating plate 28 and support two or more machining tools 48. Also, a turret that takes out the machining tool 48 from a tool container and fixes the machining tool 48 to the tool attachment parts 46 may be provided near the machine tool 10.

A dummy workpiece may be used in place of the workpiece 90. The on-machine measurement device 14 may carry out on-machine measurement of the workpiece 90 that has been machined on another device and locate the tip position of the blade 50 of the machining tool 48 of that device. The reference plane 92 may be a surface machined by another machining tool 48.

4. Invention Obtained from Embodiments

The invention graspable from the embodiments and modifications described above will be recited below.

A first aspect of the present invention provides an on-machine measurement device 14 configured to locate a tip position of a blade 50 of a machining tool 48 provided on a machining device 12. The on-machine measurement device 14 includes: a measurement unit 74 configured to measure, in a workpiece 90 that has been machined by the machining tool 48, a height of a reference plane 92 not machined by the machining tool 48 and a height of a machined surface 94 machined by the machining tool 48; and a locating unit 82 configured to locate the tip position of the blade 50 of the machining tool 48 based on information on a machining depth specified at the time of machining of the workpiece 90, and the height of the reference plane 92 and the height of the machined surface 94 that are measured by the measurement unit 74.

According to the configuration above, the actually machined depth is measured by calculating a difference between the height of the reference plane 92 and the height of the machined surface 94, and the machined depth is compared with the machining depth that is specified at the time of machining, to thereby locate the tip position of the blade 50 of the machining tool 48 on the machining device 12. The actually machined depth can be measured using the probe 52 or the like. It is thus possible to measure the tip position of the blade 50 irrespective of the material of the machining tool 48.

In the first aspect of the invention, the machining device 12 may form a recessed portion 96 having the machining depth in the workpiece 90 by performing a grooving operation of relatively moving the machining tool 48 in a first direction (e.g., rearward) with the blade 50 of the machining tool 48 abutting on the workpiece 90, while sequentially shifting the machining tool 48 by a given pitch in a second direction (e.g., leftward) that intersects the first direction, and a bottom surface 98 of the recessed portion 96 may have the machined surface 94 where a plurality of V-grooves 100 having a sectional shape corresponding to a tip shape of the blade 50 extend along the first direction and lie side by side successively in the second direction.

In the first aspect of the invention, the on-machine measurement device 14 may further include: a probe 52 including a contactor 54 that is larger than a width of the V-grooves 100; a first motor (z-axis servomotor 34z) configured to cause the probe 52 to relatively move in a direction toward the workpiece 90 and a direction away from the workpiece 90; and a first rotational position sensor (z-axis encoder 36z) configured to detect a rotational position of the first motor. The measurement unit 74 may be configured to: control the first motor to bring the probe 52 and the reference plane 92 close to each other, and calculate the height of the reference plane 92 based on a detection value detected by the first rotational position sensor when the contactor 54 makes contact with the reference plane 92; and control the first motor to bring the probe 52 and the machined surface 94 close to each other, and calculate the height of the machined surface 94 based on a detection value detected by the first rotational position sensor when the contactor 54 makes contact with the machined surface 94, information on the given pitch, and information on the tip shape of the blade 50.

In the first aspect of the invention, the on-machine measurement device 14 may further include: a second motor (y-axis servomotor 34$y$) configured to cause the probe 52 to relatively move in the second direction (e.g., leftward); and a second rotational position sensor (y-axis encoder 36$y$) configured to detect a rotational position of the second motor. The measurement unit 74 may be configured to control the second motor to relatively move the probe 52 in the second direction, and calculate the height of the machined surface 94 based on a detection value indicating a height of a shallowest position among detection values detected by the second rotational position sensor at multiple positions, the information on the given pitch, and the information on the tip shape of the blade 50.

According to the configuration above, the fine V-grooves 100 in correspondence with the tip shape of the blade 50 are formed in the machined surface 94, and the height of the deepest portions 102 of the V-grooves 100 can be obtained by calculation even if the contactor 54 of the probe 52 cannot contact the deepest portions 102. It is thus possible to obtain the height of the machined surface 94 accurately. It is hence possible to accurately locate the tip position of the blade 50 of the machining tool 48.

In the first aspect of the invention, the on-machine measurement device 14 may further include: a second motor (y-axis servomotor 34$y$) configured to cause the probe 52 to relatively move in the second direction (e.g., leftward); and a second rotational position sensor (y-axis encoder 36$y$) configured to detect a rotational position of the second motor. The measurement unit 74 may be configured to control the second motor to relatively move the probe 52 in the second direction with the contactor 54 of the probe 52 in contact with the machined surface 94, and calculate the height of the machined surface 94 based on a detection value indicating a height of a shallowest position among detection values detected by the second rotational position sensor, the information on the given pitch, and the information on the tip shape of the blade 50.

According to the configuration above, the fine V-grooves 100 in correspondence with the tip shape of the blade 50 are formed in the machined surface 94, and the height of the deepest portions 102 of the V-grooves 100 can be obtained by calculation even if the contactor 54 of the probe 52 cannot contact the deepest portions 102. In particular, the depth of the deepest portion 102 from the top 104 of the V-groove 100 can be calculated accurately. It is thus possible to obtain the height of the machined surface 94 more accurately. It is hence possible to more accurately locate the tip position of the blade 50 of the machining tool 48.

A second aspect of the present invention provides a machine tool 10 including the on-machine measurement device 14 according to the first aspect.

A third aspect of the present invention provides an on-machine measurement method of locating a tip position of a blade 50 of a machining tool 48 provided on a machining device 12. The on-machine measurement method includes: a measurement step of measuring, in a workpiece 90 that has been machined by the machining tool 48, a height of a reference plane 92 not machined by the machining tool 48 and a height of a machined surface 94 machined by the machining tool 48; and a locating step of locating the tip position of the blade 50 of the machining tool 48 based on information on a machining depth specified at the time of machining of the workpiece 90, and the height of the reference plane 92 and the height of the machined surface 94 that are measured in the measurement step.

According to the configuration above, the actually machined depth is measured by calculating a difference between the height of the reference plane 92 and the height of the machined surface 94, and the machined depth is compared with the machining depth that is specified at the time of machining to thereby locate the tip position of the blade 50 of the machining tool 48 on the machining device 12. The actually machined depth can be measured using the probe 52 or the like. It is thus possible to measure the tip position of the blade 50 irrespective of the material of the machining tool 48.

In the third aspect of the invention, the machining device 12 may form a recessed portion 96 having the machining depth in the workpiece 90 by performing a grooving operation of relatively moving the machining tool 48 in a first direction (e.g., rearward) with the blade 50 of the machining tool 48 abutting on the workpiece 90, while sequentially shifting the machining tool 48 by a given pitch in a second direction (e.g., leftward) that intersects the first direction, and a bottom surface 98 of the recessed portion 96 may have the machined surface 94 where a plurality of V-grooves 100 having a sectional shape corresponding to a tip shape of the blade 50 extend along the first direction and lie side by side successively in the second direction.

In the third aspect of the invention, there may be provided: a probe 52 including a contactor 54 that is larger than a width of the V-grooves 100; a first motor (z-axis servomotor 34$z$) configured to cause the probe 52 to relatively move in a direction toward the workpiece 90 and a direction away from the workpiece 90; and a first rotational position sensor (z-axis encoder 36$z$) configured to detect a rotational position of the first motor. The measurement step may include: controlling the first motor to bring the probe 52 and the reference plane 92 close to each other, and calculating the height of the reference plane 92 based on a detection value detected by the first rotational position sensor when the contactor 54 makes contact with the reference plane 92; and controlling the first motor to bring the probe 52 and the machined surface 94 close to each other, and calculating the height of the machined surface 94 based on a detection value detected by the first rotational position sensor when the contactor 54 makes contact with the machined surface 94, information on the given pitch, and information on the tip shape of the blade 50.

In the third aspect of the invention, there may be provided: a second motor (y-axis servomotor 34$y$) configured to cause the probe 52 to relatively move in the second direction (e.g., leftward); and a second rotational position sensor (y-axis encoder 36$y$) configured to detect a rotational position of the second motor. The measurement step may include controlling the second motor to relatively move the probe 52 in the second direction, and calculating the height of the machined surface 94 based on a detection value indicating a height of a shallowest position among detection values detected by the second rotational position sensor at multiple positions, the information on the given pitch, and the information on the tip shape of the blade.

According to the configuration above, the fine V-grooves 100 in correspondence with the tip shape of the blade 50 are formed in the machined surface 94, and the height of the deepest portions 102 of the V-grooves 100 can be obtained by calculation even if the contactor 54 of the probe 52 cannot contact the deepest portions 102. It is thus possible to obtain the height of the machined surface 94 accurately.

It is hence possible to accurately locate the tip position of the blade 50 of the machining tool 48.

In the third aspect of the invention, there may be provided: a second motor (y-axis servomotor 34y) configured to cause the probe 52 to relatively move in the second direction (e.g., leftward); and a second rotational position sensor (y-axis encoder 36y) configured to detect a rotational position of the second motor. The measurement step may include controlling the second motor to relatively move the probe 52 in the second direction with the contactor 54 of the probe 52 in contact with the machined surface 94, and calculating the height of the machined surface 94 based on a detection value indicating a height of a shallowest position among detection values detected by the second rotational position sensor, the information on the given pitch, and the information on the tip shape of the blade 50.

According to the configuration above, the fine V-grooves 100 in correspondence with the tip shape of the blade 50 are formed in the machined surface 94, and the height of the deepest portions 102 of the V-grooves 100 can be obtained by calculation even if the contactor 54 of the probe 52 cannot contact the deepest portions 102. In particular, the depth of the deepest portion 102 from the top 104 of the V-groove 100 can be calculated accurately. It is thus possible to obtain the height of the machined surface 94 more accurately. It is hence possible to more accurately locate the tip position of the blade 50 of the machining tool 48.

The on-machine measurement device, the machine tool, and the on-machine measurement method according to the present invention are not limited to the embodiments and modifications described above but can of course adopt various configurations without departing from the scope of the invention.

What is claimed is:

1. An on-machine measurement device configured to locate a tip position of a blade of a machining tool provided on a machining device, the on-machine measurement device comprising:
   a measurement unit configured to measure, in a workpiece that has been machined by the machining tool, a height of a reference plane not machined by the machining tool and a height of a machined surface machined by the machining tool; and
   a locating unit configured to locate the tip position of the blade of the machining tool based on information on a machining depth specified at a time of machining of the workpiece, and the height of the reference plane and the height of the machined surface that are measured by the measurement unit.

2. The on-machine measurement device according to claim 1, wherein
   the machining device is configured to form a recessed portion having the machining depth in the workpiece by performing a grooving operation of relatively moving the machining tool in a first direction with the blade of the machining tool abutting on the workpiece, while sequentially shifting the machining tool by a given pitch in a second direction that intersects the first direction, and
   a bottom surface of the recessed portion has the machined surface where a plurality of V-grooves having a sectional shape corresponding to a tip shape of the blade extend along the first direction and lie side by side successively in the second direction.

3. The on-machine measurement device according to claim 2, further comprising:
   a probe including a contactor that is larger than a width of the V-grooves;
   a first motor configured to cause the probe to relatively move in a direction toward the workpiece and a direction away from the workpiece; and
   a first rotational position sensor configured to detect a rotational position of the first motor,
   wherein the measurement unit is configured to:
   control the first motor to bring the probe and the reference plane close to each other, and calculate the height of the reference plane based on a detection value detected by the first rotational position sensor when the contactor makes contact with the reference plane; and
   control the first motor to bring the probe and the machined surface close to each other, and calculate the height of the machined surface based on a detection value detected by the first rotational position sensor when the contactor makes contact with the machined surface, information on the given pitch, and information on the tip shape of the blade.

4. The on-machine measurement device according to claim 3, further comprising:
   a second motor configured to cause the probe to relatively move in the second direction; and
   a second rotational position sensor configured to detect a rotational position of the second motor,
   wherein the measurement unit is configured to control the second motor to relatively move the probe in the second direction, and calculate the height of the machined surface based on a detection value indicating a height of a shallowest position among detection values detected by the second rotational position sensor at multiple positions, the information on the given pitch, and the information on the tip shape of the blade.

5. The on-machine measurement device according to claim 3, further comprising:
   a second motor configured to cause the probe to relatively move in the second direction; and
   a second rotational position sensor configured to detect a rotational position of the second motor,
   wherein the measurement unit is configured to control the second motor to relatively move the probe in the second direction with the contactor of the probe in contact with the machined surface, and calculate the height of the machined surface based on a detection value indicating a height of a shallowest position among detection values detected by the second rotational position sensor, the information on the given pitch, and the information on the tip shape of the blade.

6. A machine tool comprising the on-machine measurement device according to claim 1.

7. An on-machine measurement method of locating a tip position of a blade of a machining tool provided on a machining device, the on-machine measurement method comprising:
   a measurement step of measuring, in a workpiece that has been machined by the machining tool, a height of a reference plane not machined by the machining tool and a height of a machined surface machined by the machining tool; and
   a locating step of locating the tip position of the blade of the machining tool based on information on a machining depth specified at a time of machining of the workpiece, and the height of the reference plane and the height of the machined surface that are measured in the measurement step.

8. The on-machine measurement method according to claim 7, wherein
the machining device is configured to form a recessed portion having the machining depth in the workpiece by performing a grooving operation of relatively moving the machining tool in a first direction with the blade of the machining tool abutting on the workpiece, while sequentially shifting the machining tool by a given pitch in a second direction that intersects the first direction, and
a bottom surface of the recessed portion has the machined surface where a plurality of V-grooves having a sectional shape corresponding to a tip shape of the blade extend along the first direction and lie side by side successively in the second direction.

9. The on-machine measurement method according to claim 8, wherein there are provided:
a probe including a contactor that is larger than a width of the V-grooves;
a first motor configured to cause the probe to relatively move in a direction toward the workpiece and a direction away from the workpiece; and
a first rotational position sensor configured to detect a rotational position of the first motor, and
wherein the measurement step includes:
controlling the first motor to bring the probe and the reference plane close to each other, and calculating the height of the reference plane based on a detection value detected by the first rotational position sensor when the contactor makes contact with the reference plane; and
controlling the first motor to bring the probe and the machined surface close to each other, and calculating the height of the machined surface based on a detection value detected by the first rotational position sensor when the contactor makes contact with the machined surface, information on the given pitch, and information on the tip shape of the blade.

10. The on-machine measurement method according to claim 9, wherein there are provided:
a second motor configured to cause the probe to relatively move in the second direction; and
a second rotational position sensor configured to detect a rotational position of the second motor, and
wherein the measurement step includes controlling the second motor to relatively move the probe in the second direction, and calculating the height of the machined surface based on a detection value indicating a height of a shallowest position among detection values detected by the second rotational position sensor at multiple positions, the information on the given pitch, and the information on the tip shape of the blade.

11. The on-machine measurement method according to claim 9, wherein there are provided:
a second motor configured to cause the probe to relatively move in the second direction; and
a second rotational position sensor configured to detect a rotational position of the second motor, and
wherein the measurement step includes controlling the second motor to relatively move the probe in the second direction with the contactor of the probe in contact with the machined surface, and calculating the height of the machined surface based on a detection value indicating a height of a shallowest position among detection values detected by the second rotational position sensor, the information on the given pitch, and the information on the tip shape of the blade.

* * * * *